United States Patent [19]

Jansen et al.

[11] Patent Number: 5,759,506
[45] Date of Patent: *Jun. 2, 1998

[54] PROCESS FOR PREPARING AEROGELS

[75] Inventors: Rolf-Michael Jansen, Kelkheim; Andreas Zimmermann, Griesheim, both of Germany

[73] Assignee: Hoechst Aktiengesellschaft, Frankfurt, Germany

[*] Notice: The term of this patent shall not extend beyond the expiration date of Pat. No. 5,647,962.

[21] Appl. No.: 836,184

[22] PCT Filed: Oct. 23, 1995

[86] PCT No.: PCT/EP95/04141

§ 371 Date: May 1, 1997

§ 102(e) Date: May 1, 1997

[87] PCT Pub. No.: WO96/14266

PCT Pub. Date: May 17, 1996

[30] Foreign Application Priority Data

Nov. 3, 1994 [DE] Germany ............... 44 39 217.6

[51] Int. Cl.$^6$ .................. B01D 3/34; C01B 33/12
[52] U.S. Cl. .................. 423/338; 203/57; 502/233
[58] Field of Search .................. 423/338; 203/57; 502/233

[56] References Cited

U.S. PATENT DOCUMENTS 3,794,713   2/1974   Aboutboul et al.
5,647,962   7/1997   Jansen et al. ............... 423/338

FOREIGN PATENT DOCUMENTS 682574   11/1952   United Kingdom.
WO 92/20623   11/1992   WIPO.

*Primary Examiner*—Paul Marcantoni
*Attorney, Agent, or Firm*—Frommer Lawrence Haug LLP

[57] ABSTRACT

The invention relates to a process for preparing modified $SiO_2$ gels, in which the gel is aged using a solution of a condensable alkyl and/or aryl orthosilicate, or using an aqueous silicic acid solution, in order to strengthen the structure of the gel.

10 Claims, No Drawings

PROCESS FOR PREPARING AEROGELS

DESCRIPTION

The invention relates to a process for preparing modified $SiO_2$ gels, referred to below as "aerogels".

Aerogels in the wider sense, i.e. in the sense of "gel with air as dispersion medium", are prepared by drying a suitable gel. The term "aerogel" in this sense includes aerogels in the narrower sense, xerogels and cryogels. A dried gel is referred to as an aerogel in the narrower sense if the gel liquid is removed at temperatures above the critical temperature, and starting at pressures above the critical pressure. If the gel liquid is, on the other hand, removed subcritically, for example with formation of a liquid-vapor boundary phase, the resultant gel is referred to as a xerogel. It should be noted that the gels prepared according to the invention are aerogels in the sense of gel with air as dispersion medium. Since these gels are prepared by sub-critical drying, they may, however, also be referred to as xerogels.

$SiO_2$ aerogels are known for their excellent heat insulation efficiency. They can be prepared, for example, by acid hydrolysis of tetraethyl orthosilicate in ethanol. The hydrolysis gives a gel whose structure can be influenced by the temperature, the pH and the duration of the gelling process. However, the gel structure generally collapses when the wet gel is dried, since the capillary forces arising during the drying are extremely large. Collapse of the gel can be prevented by carrying out the drying at a temperature above the critical temperature and at a pressure above the critical pressure of the solvent. Since the liquid/gaseous phase boundary disappears in this region, capillary forces are also absent, and the gel does not change its nature during the drying process, i.e. there is also no shrinkage of the gel during drying. Preparation processes based on this drying technique are known, for example, from EP-B-0 396 076 and WO 92/03378. This technique requires, however, for example if ethanol is used, a temperature greater than 240° C. and pressures of up to 40 bar.

Although the drying temperature is reduced to about 40° C. if ethanol is replaced by $CO_2$ before drying, the necessary pressure, however, is then 80 bar.

WO 92/20623 discloses a process in which $SiO_2$ aerogels are prepared by hydrolysis and polycondensation of tetraalkoxysilanes, wherein the aqueous/alcoholic gel is aged in a solution of tetraalkoxysilanes in order to increase the strength of the gel structure. However, the prior art has the disadvantages that extremely expensive raw materials, such as tetraalkoxysilanes, are employed both for preparing and for aging of the gels, and that the dwell times necessary for aging of the gel and strengthening of the structure are very long.

It has now been found that deionized $SiO_2$ gels, prepared from inexpensive water glass, can be dried under sub-critical conditions if, before drying, they are aged in an aqueous/organic solution of alkyl and/or aryl ortho-silicate and/or free silicic acid. The products obtained are referred to below as "aerogels", and have outstanding heat insulation efficiency.

The invention therefore relates to a process for preparing aerogels, which comprises a) bringing an aqueous water glass solution to a pH of $\leq 3$, using an acid ion exchanger or a mineral acid, b) polycondensing the silicic acid thus produced, by addition of a base, to give an $SiO_2$ gel, and, if a mineral acid was used in step a), washing the gel with water until it is free of electrolytes, c) if required, washing the gel obtained in step b) with a suitable alcohol or organic solvent until the water content of the gel is <20% by weight, d) aging the gel obtained in step b) or c), using a solution of a condensable alkyl and/or aryl ortho-silicate of the formula $R^1_{4-n}Si(OR^2)_n$, where n is from 1 to 4 and $R^1$ and $R^2$, independently of one another, are $C_1$–$C_6$-alkyl, cyclohexyl or phenyl, or using an aqueous silicic acid solution, in order to strengthen the gel structure, e) subcritically drying the aged gel obtained in step d).

In step a), an acid ion-exchanger resin is preferably employed, those containing sulfonic acid groups being particularly suitable. If mineral acids are employed, hydrochloric and sulfuric acid are especially suitable. The water glass used is in general sodium water glass and/or potassium water glass.

The base used in step b) is preferably $NH_4OH$, $NaOH$, $KOH$, $Al(OH)_3$, colloidal silicic acid and/or water glass. If a mineral acid is used in step a), the $SiO_2$ gel which is formed by the action of the base is washed with water until it is free of electrolytes; the washing is preferably continued until the washings have the same electrical conductivity as deionized water.

Before step c), the gel is preferably aged, in general at a temperature between the freezing point and the boiling point of the solution, preferably at from 0° to 120° C., particularly preferably at from 60° to 100° C., and at a pH of from 4 to 11, preferably from 4 to 9. The duration of the aging is generally from 10 seconds to 48 hours, preferably from 10 seconds to 5 hours.

If the gel strengthening in step d) is carried out using a solution of an alkyl and/or aryl orthosilicate, the gel is preferably washed in step c) with a suitable alcohol or organic solvent until the water content is <10% by weight. The alcohols generally used are linear or branched aliphatic alcohols, preferably methanol, ethanol, propanol, isopropanol, butanol or isobutanol. It is also possible to employ other organic solvents which are miscible with water, for example THF or acetone, or mixtures of such solvents.

If the gel strengthening in step d) is carried out using an inorganic, low-molecular-weight silicic acid, the solvent in step c) is preferably water. It may be advantageous to perform a solvent exchange by introducing organic admixtures (alcohols, aldehydes and/or ketones) into the aqueous phase, and to vary the pH between 3 and 11 in order to influence the rate of condensation and the deposition of the $SiO_2$ from the silicic acid which is added in step d).

The gel strengthening in step d) is carried out by introduction (eg. diffusion) of a condensable $SiO_2$ source into the pore space of the gel prepared in step b) and, if required, treated in step c), and then depositing the $SiO_2$ source on the existing gel framework by a condensation reaction.

The $SiO_2$ source employed can be either an alkyl and/or aryl orthosilicate of the formula $R^1_{4-n}Si(OR^2)_n$ or a dilute solution of a low-molecular-weight silicic acid. If the gel strengthening is to be carried out using the abovementioned orthosilicate or mixtures of different orthosilicates of the same formula, then the gel treated in step c) is aged in an alcoholic solution of the orthosilicate. The orthosilicates employed are preferably orthosilicates of the formula $R^1_{4-n}Si(OR^2)_n$ where n is from 1 to 4, and $R^1$ and $R^2$, independently of one another, are $C_1$–$C_6$-alkyl, cyclohexyl or phenyl. Tetraethyl and/or tetramethyl orthosilicate is/are particularly preferable. The concentration of the orthosilicate in the alcoholic solution is from 0.1 to 30% by volume, preferably from 1 to 10% by volume. The alcohols used are generally linear or branched aliphatic alcohols, preferably methanol, ethanol, propanol, isopropanol, butanol or isobutanol. The duration of the aging is in general from 10 minutes to 48 hours, preferably from 10 minutes to 24 hours.

As an alternative to the use of orthosilicates in step d) for gel strengthening, dilute aqueous solutions of low-molecular-weight silicic acid and/or of alkali metal silicates can also be used. Use of free silicic acid, obtained, for example, from an aqueous solution with the help of an abovementioned ion exchanger, has the advantage that none of the salt ions which derive from the pH adjustment and neutralization of the water glass solution and adversely affect the drying process remain in the gel. Preference is given to a silicic acid solution having a concentration of from 1 to 10% by weight, particularly preferably from 4 to 7% by weight, prepared, for example, by cation exchange on an abovementioned ion-exchange resin. Organic fractions, such as ketones, aldehydes or branched or unbranched alcohols may, furthermore, be added to the solution in suitable concentration in order to influence the polycondensation of the silicic acid, the growth of clusters in the polycondensates during their formation, and the deposition on the gel framework formed in step b) and, if required, treated in step c). The upper limit of the total organic admixture is determined by the precipitation of the first $SiO_2$ fractions.

Steps a) to d) are preferably carried out at a temperature between the freezing point of the solution and 150° C., and at a pressure of from 1 to 10 bar.

In step e), the aged gel is dried subcritically, preferably at temperatures from −30° to 200° C., particularly preferably from 0° to 150° C. The pressures applied during drying are preferably from 0.001 to 20 bar, particularly preferably from 0.01 to 5 bar. The drying is generally continued until the gel has a residual solvent content of less than 0.1% by weight.

The novel process is described in greater detail below by means of a working example.

EXAMPLE 1 l of a sodium water glass solution (containing 8% by weight $SiO_2$ and with a $Na_2O$:$SiO_2$ ratio of 1:3.3) is passed (20 ml/min) through a column (diameter: 50 mm, length: 300 mm) filled with 0.5 l of an acid ion-exchange is resin (styrene-divinylbenzene copolymer with sulfonic acid groups, commercially available as Duolite® C20). The pH of the eluted solution is 2.3. The solution is then set to a pH of 5.6 using 1 molar NaOH solution, after which the resultant gel is mechanically comminuted with a stirrer (mean particle size <0.5 mm) and the water is then separated from the gel using ethanol at 50° C. in a continuously-operating extraction vessel to a residual water content in the gel of <10% by weight. The gel is then aged at 60° C. for 24 hours in an ethanolic solution of tetraethyl orthosilicate (concentration 10% by volume). The drying of the gel is carried out in a nitrogen-flushed dryer (6 hours at 60° C. and 12 hours at 150° C.).

The transparent aerogel thus obtained has a density of 0.25 g/cm³, a BET specific surface area of approximately 820 m²/g and a λ value of 0.027 W/mK.

The thermal conductivity was measured by a hot wire method (see, for example, O. Nielsson, G. Rüschenpöhler, J. Grob, J. Fricke, High Temperatures—High Pressures, Vol. 21, 267–274 (1989)).

We claim:

1. A process for preparing aerogels, which comprises a) bringing an aqueous water glass solution to a pH of ≦3 using an acid ion exchanger or a mineral acid, b) polycondensing the silicic acid thus produced, by addition of a base, to give an $SiO_2$ gel, and, if a mineral acid was used in step a), washing the gel with water until it is free of electrolytes, c) if required, washing the gel obtained in step b) with a suitable alcohol or organic solvent until the water content of the gel is <20% by weight, d) aging the gel obtained in step b) or c), using a solution of a condensable alkyl and/or aryl ortho-silicate of the formula $R^1_{4-n}Si(OR^2)_n$, where n is 3 or 4 and $R^1$ and $R^2$, independently of one another, are $C_1$–$C_6$-alkyl, cyclohexyl or phenyl, or using an aqueous silicic acid solution, in order to strengthen the gel structure, e) subcritically drying the aged gel obtained in step d).

2. The process as claimed in claim 1, wherein the base used in step b) is $NH_4OH$, NaOH, KOH, $Al(OH)_3$, colloidal silicic acid and/or water glass.

3. The process as claimed in claim 1, wherein the $SiO_2$ gel obtained in step b) is aged at a temperature between the freezing point and the boiling point of the solution, and at a pH of from 4 to 11, over a period of from 10 seconds to 48 hours, before the water is removed in step c).

4. The process as claimed in claim 1, wherein linear or branched aliphatic alcohols are used in step c).

5. The process as claimed in claim 1, wherein the alcohol used in steps c) and/or d), independently of one another, is methanol, ethanol, propanol, isopropanol, butanol or isobutanol.

6. The process as claimed in claim 1, wherein, in step d), tetramethyl orthosilicate and/or tetraethyl orthosilicate is/are used.

7. The process as claimed in claim 1, wherein, in step d), the concentration of the orthosilicate in the alcoholic solution is from 0.1 to 30% by volume.

8. The process as claimed in claim 1, wherein, in step d), the gel is aged for from 10 minutes to 48 hours.

9. The process as claimed in claim 1, wherein steps a) to d) are carried out at a temperature between the freezing point of the solution and 150° C. and at a pressure of from 1 to 10 bar.

10. The process as claimed in claim 1, wherein, in step e), the aged gel is dried at from −30° to 200° C. and at from 0.001 to 20 bar.

* * * * *